US009043755B2

(12) United States Patent
Eska et al.

(10) Patent No.: US 9,043,755 B2
(45) Date of Patent: May 26, 2015

(54) CUSTOM CODE LIFECYCLE MANAGEMENT

(75) Inventors: Veit Eska, Malsch (DE); Bjoern Panter, Saabruecken (DE); Juergen Mahler, Malsch (DE)

(73) Assignee: SAP SE, Walldorf (DE)

( * ) Notice: Subject to any disclaimer, the term of this patent is extended or adjusted under 35 U.S.C. 154(b) by 526 days.

(21) Appl. No.: 13/006,059

(22) Filed: Jan. 13, 2011

(65) Prior Publication Data

US 2012/0185827 A1      Jul. 19, 2012

(51) Int. Cl.
*G06F 9/44* (2006.01)

(52) U.S. Cl.
CPC ... *G06F 8/71* (2013.01); *G06F 8/36* (2013.01); *G06F 8/30* (2013.01); *G06F 9/4435* (2013.01)

(58) Field of Classification Search
None
See application file for complete search history.

(56) References Cited

U.S. PATENT DOCUMENTS

| | | | | |
|---|---|---|---|---|
| 5,313,387 | A * | 5/1994 | McKeeman et al. | 700/90 |
| 6,226,792 | B1 * | 5/2001 | Goiffon et al. | 717/120 |
| 6,230,309 | B1 * | 5/2001 | Turner et al. | 717/107 |
| 6,308,314 | B1 * | 10/2001 | Carlson et al. | 717/104 |
| 6,496,850 | B1 * | 12/2002 | Bowman-Amuah | 709/203 |
| 6,529,948 | B1 * | 3/2003 | Bowman-Amuah | 709/217 |
| 6,957,417 | B2 * | 10/2005 | Turner et al. | 717/108 |
| 6,993,530 | B2 * | 1/2006 | Lee et al. | 707/769 |
| 7,421,715 | B1 * | 9/2008 | Margulis et al. | 719/331 |
| 7,434,200 | B2 * | 10/2008 | Bender | 717/100 |
| 7,509,540 | B1 * | 3/2009 | Lovy et al. | 714/57 |
| 2001/0018648 | A1 * | 8/2001 | Turner et al. | 703/22 |
| 2002/0152423 | A1 * | 10/2002 | McCabe | 714/15 |
| 2003/0033590 | A1 * | 2/2003 | Leherbauer | 717/122 |
| 2003/0056193 | A1 * | 3/2003 | Perycz et al. | 717/107 |
| 2004/0153994 | A1 | 8/2004 | Bates et al. | |
| 2004/0268309 | A1 * | 12/2004 | Grover et al. | 717/120 |
| 2005/0091255 | A1 * | 4/2005 | Rajan et al. | 707/102 |
| 2006/0041881 | A1 | 2/2006 | Adkasthala | |
| 2006/0294158 | A1 * | 12/2006 | Tsyganskiy et al. | 707/202 |
| 2009/0063584 | A1 * | 3/2009 | Abzarian et al. | 707/203 |
| 2009/0112460 | A1 * | 4/2009 | Baker et al. | 701/208 |
| 2009/0132815 | A1 * | 5/2009 | Ginter et al. | 713/164 |
| 2010/0185682 | A1 * | 7/2010 | Grinshpun et al. | 707/803 |
| 2010/0185963 | A1 * | 7/2010 | Slik et al. | 715/764 |
| 2011/0154311 | A1 | 6/2011 | Acker et al. | |

OTHER PUBLICATIONS

Henry Morris et al., "Managing Master Data for Business Performance Management: The Issues and Hyperion's Solution", IDC, 2005, <http://www.oracle.com/technetwork/middleware/bi-foundation/idc-whitepaper-managing-master-data-129545.pdf>, pp. 1-14.*

(Continued)

*Primary Examiner* — Thuy Dao
*Assistant Examiner* — Samuel Hayim
(74) *Attorney, Agent, or Firm* — Schwegman Lundberg & Woessner, P.A.

(57) ABSTRACT

A method is provided to manage program code that runs in a computer system comprising: producing a management information structure that identifies a managed system within the computer system; producing a master object definition information structure that provides a mapping between master objects and corresponding managed code objects that run in the computer system; and requesting extraction of information from the managed system identified by the master information structure that relates to managed code objects that the object definition information structure maps to master objects.

16 Claims, 12 Drawing Sheets

(56) References Cited

OTHER PUBLICATIONS

Ting Wang et al., "A Temporal Data-Mining Approach for Discovering End-to-End Transaction Flows", IEEE, 2005, <http://ieeexplore.ieee.org/stamp/stamp.jsp?tp=&arnumber=4670157>, pp. 1-8.*

Xuequn Shang et al., "Depth-First Frequent Itemset Mining in Relational Databases", ACM, 2005, <http://delivery.acm.org/10.1145/1070000/1066928/p1112-shang.pdf>, pp. 1-6.*

"U.S. Appl. No. 13/222,907, Non Final Office Action mailed Feb. 14, 2014", 39 pgs.

"U.S. Appl. No. 13/222,907, Notice of Allowance mailed Oct. 10, 2014", 13 pgs.

"U.S. Appl. No. 13/222,907, Response filed May 30, 2014 to Non Final Office Action mailed Feb. 14, 2014", 14 pgs.

* cited by examiner

```
<?xml version="1.0" ?>
- <DATA_LIBRARY_DEF>
- <LIBRARY_DEF STATUS="A" LIBRARY_ID="Custom+Code_Library" CREATE_USER="ESKA" CREATE_DAT="20100616"
    CREATE_TIME="112309" SHORTTEST="Custom Code Library" LANGUAGE="E">
  + <OBJECTDEF OBJECT_ID="AnalysisTool" CREATE_USER="ESKA" CREATE_DATE="20100623" CREATE_TIME="095842">
  + <OBJECTDEF OBJECT_ID="CustomCodeDuplicate" CREATE_USER="ESKA" CREATE_DATE="20100623" CREATE_TIME="114555">
  + <OBJECTDEF OBJECT_ID="CustomCodeItem" CREATE_USER="ESKA" CREATE_DATE="20100623" CREATE_TIME="095525">
  - <OBJECTDEF OBJECT_ID="CustomCodeObject" CREATE_USER="ESKA" CREATE_DATE="20100622" CREATE_TIME="152914">
    <SHORTTEXT LANGU="E">CustomCode Object</SHORTTEXT>
  - <ATTR2OBJ ATTR_ID="Author" SEARCHABLE="X" CREATE_USER="ESKA" CREATE_DATE="20100623" CREATE_TIME="105854">
    <ATTRIBUTEDEF ATTR_ID="Author" TYPE="String" LENG="000012" DECIMALS="000003" CARDINALITY="1" LOWERCASE="X"
      CREATE_USER="ESKA" CREATE_DATE="20100623" CREATE_TIME="105328" />
    <SHORTTEXT LANGU="E" ATTR_ID="Author">Person Responsible for a Repository Object</SHORTTEXT>
  </ATTR2OBJ>
  - <ATTR2OBJ ATTR_ID="CRelease" SEARCHABLE="X" CREATE_USER="ESKA" CREATE_DATE="20100623" CREATE_TIME="111941">
    <ATTRIBUTEDEF ATTR_ID="CRelease" TYPE="String" LENG="000010" DECIMALS="000003" CARDINALITY="1" LOWERCASE="X"
      CREATE_USER="ESKA" CREATE_DATE="20100623" CREATE_TIME="111944" />
    <SHORTTEXT LANGU="E" ATTR_ID="CRelease">SAP Release</SHORTTEXT>
  </ATTR2OBJ>
  - <ATTR2OBJ ATTR_ID="CorrNumber" SEARCHABLE="X" CREATE_USER="ESKA" CREATE_DATE="20100623" CREATE_TIME="105138">
    <ATTRIBUTEDEF ATTR_ID="CorrNumber" TYPE="String" LENG="000010" DECIMALS="000003" CARDINALITY="1"
      CREATE_USER="ESKA" CREATE_DATE="20100623" CREATE_TIME="105243" />
    <SHORTTEXT LANGU="E" ATTR_ID="CorrNumber">Request/Task</SHORTTEXT>
  </ATTR2OBJ>
  - <ATTR2OBJ ATTR_ID="Created_On" SEARCHABLE="X" CREATE_USER="ESKA" CREATE_DATE="20100623" CREATE_TIME="111941">
    <ATTRIBUTEDEF ATTR_ID="Created_On" TYPE="Date" LENG="000040" CARDINALITY="1" CREATE_USER="ESKA"
      CREATE_USER="20100702" CREATE_DATE="092552" />
    <SHORTTEXT LANGU="E" ATTR_ID="Created_On">Creation Date of the TADIR Object</SHORTTEXT>
  </ATTR2OBJ>
  - <ATTR2OBJ ATTR_ID="CriticalityLevel" SEARCHABLE="X" CREATE_USER="ESKA" CREATE_DATE="20100623">
    <ATTRIBUTEDEF ATTR_ID="CriticalityLevel" TYPE="String" LENG="000001" CARDINALITY="1" MAINTAINABLE="X"
      CREATE_USER="ESKA" CREATE_DATE="20100623" CREATE_TIME="110109" />
    <SHORTTEXT LANGU="E" ATTR_ID="CriticalityLevel">Criticality</SHORTTEXT>
  </ATTR2OBJ>
  - <ATTR2OBJ ATTR_ID="Date_Add_to_Lib" TYPE="Date" LENG="000040" DECIMALS="000003" CARDINALITY="1"
    CREATE_TIME="092648">
    <ATTRIBUTEDEF ATTR_ID="Date_Add_to_Lib" TYPE="Date" LENG="000040" DECIMALS="000003" CARDINALITY="1"
      CREATE_USER="ESKA" CREATE_DATE="20100702" CREATE_TIME="092552" />
```

Figure 4

Custom Code Lifecycle Management

Overview
Settings
Library Definition
Objects
Reports
▼ Common Tasks
Call CDMC application
Check Extractor Framework

Filter Objects by

Search Objects with Attributes

| Export ◢ | Create Owner | Create Contract | Delete | Add Reference | Maintain Attributes | | Settings |
|---|---|---|---|---|---|---|---|
| Object ID | Object Class | | Object Name | | | Change D... | Change Time |
| 1 | CustomCodeObject | | /BAOF/EC_CMP_CUST | | | 04.11.2010 | 12:12:22 |
| 2 | CustomCodeObject | | /BAOF/EC_CMP_CUST | | | 04.11.2010 | 12:12:23 |
| 3 | CustomCodeObject | | /BAOF/EC_RUNTIME_DAT | | | 04.11.2010 | 12:12:23 |
| 4 | CustomCodeObject | | /BAOF/EC_SCEN_CUST | | | 04.11.2010 | 12:12:23 |
| 5 | CustomCodeObject | | ZGG_01 | | | 04.11.2010 | 12:12:23 |
| 6 | CustomCodeObject | | ZRAY_PECE_LIST | | | 04.11.2010 | 12:12:23 |
| 7 | CustomCodeObject | | ZZ_GAB_SMUD_HOME | | | 04.11.2010 | 12:12:23 |
| 8 | CustomCodeObject | | Z_DEVC_DSWP_TASK_MAN | | | 04.11.2010 | 12:12:23 |

Last Refresh: 17.11.2010 08:01:11 CET Refresh

Details of Selected Object

Standard Attributes / Maintainable Attributes

| Export ◢ | Create | Change | Delete | | Settings |
|---|---|---|---|---|---|
| Attribute ID | Attribute Class | Attribute Value | | Change D... | Change Ti... |
| 483101 | Ref_2_Owner | 0000033672 | | 16.10.2010 | 14:07:11 |
| 1002350 | Criticality-Level | 3 | | 16.11.2010 | 14:00:01 |
| 1002352 | SeverityLevel | 3 | | 16.11.2010 | 14:09:08 |

Figure 8

CUSTOM CODE LIFECYCLE MANAGEMENT

BACKGROUND

In a computer system configured to implement an object oriented program environment, new objects may be created, and existing objects may be modified. Duplicates of an object may be instantiated in different parts of a computer system of an organization. As a result, over time the number and complexity and diversity of objects may increase, and their distribution throughout the system may expand making it difficult to keep track of and manage such objects. Therefore, there has been a need for an improved approach to managing large numbers of objects in a complex object oriented environment.

SUMMARY

In one aspect, a method is provided to manage program code that runs in a computer system. A master object definition information structure is produced in a computer readable storage device includes a management information structure that identifies a managed system within the computer system and that identifies managed code objects that run in the managed system. A transaction instance information structure is produced that associates master objects within the master object definition information structure with tables to store extracted information. A request for extraction of information from the managed system identified by the master object definition information structure that relates to the identified managed code objects is made and the extracted information is stored to the associated tables.

In another aspect, the extracted information includes information about managed code object quality.

In another aspect, the extracted information includes information about managed code object usage.

In another aspect, the extracted information includes information about managed code object version.

In another aspect, the managed system about managed code objects store the received information in the tables.

In another aspect, the management information structure identifies an extraction tool and the act of requesting extraction includes requesting extraction using the identified extraction tool.

In another aspect, the management information structure indicates at least a system and a system instance to identify a managed system.

In another aspect, the management information structure indicates restrictions on modifications to the management information structure.

In another aspect, the master object definition structure includes a library identifier for a library in which extracted information is stored.

In another aspect, the master object definition structure includes a library identifier for a storage that includes the tables to store the extracted information.

In another aspect, the transaction instance information structure includes the library identifier for the storage that includes the tables to store the extracted information.

In another aspect, the management information structure is a class structure of master objects identified within the master object definition information structure.

In another aspect, the master object definition information structure defines relations between master objects and attributes that relate to corresponding managed code objects.

In another aspect, the master object definition information structure defines relations between master objects and attribute objects that relate to corresponding managed code objects; the management information structure is a class structure of master objects identified within the master object definition information structure; and the management information structure is a class structure of attribute objects identified within the master object definition information structure.

In another aspect, an article of manufacture is provided that includes a computer readable storage device that stores program code in one or more information structures. The information structures include a master object definition information structure in a computer readable storage device that includes a management information structure that identifies a managed system within the computer system and that identifies managed code objects that run in the managed system. The information structures also include a transaction instance information structure that associates master objects within master object definition information structure with tables to store extracted information.

In another aspect, the master object definition structure of the article includes a library identifier for a storage that includes the tables to store the extracted information.

In another aspect, the transaction instance information structure of the article includes the library identifier for the storage that includes the tables to store the extracted information.

In another aspect, the management information structure of the article identifies an extraction tool.

In another aspect, the master object definition information structure of the article defines relations between master objects and attributes that relate to corresponding managed code objects.

In another aspect, the management information structure of the article is a class structure associated with master objects identified within the master object definition information structure.

In another aspect, the master object definition information structure of the article defines relations between master objects and attributes that relate to corresponding managed code objects, and the management information structure of the article is a class structure of attribute objects identified within the master object definition information structure.

In another aspect, a computer system is provided that includes a storage device. A master object definition information structure in the storage device includes a management information structure that identifies a managed system within the computer system and that identifies managed code objects that run in the managed system. A user interface means is provided for managing the management information structure. The management information structure is a class structure associated with master objects identified within the master object definition information structure. A transaction instance information structure is provided in the storage device that associates master objects within master object definition information structure with tables to store extracted information. The master object definition structure includes a library identifier for the storage device that includes the tables to store the extracted information.

BRIEF DESCRIPTION OF THE DRAWINGS

FIG. 4 is an illustrative drawing showing a representative portion of the management information structure in XML that provides relations between objects of the structure of FIG. 3 and attributes associated with the objects.

FIG. 8 is an illustrative drawing of an example user interface display screen in which a user has selected an object for maintenance in accordance with some embodiments.

DESCRIPTION OF THE EMBODIMENTS

The following description is presented to enable any person skilled in the art to create and use a computer system configuration and related method and article of manufacture to monitor and manage custom code running within a computer system during a lifecycle of the code. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

Introduction

Figure 1:
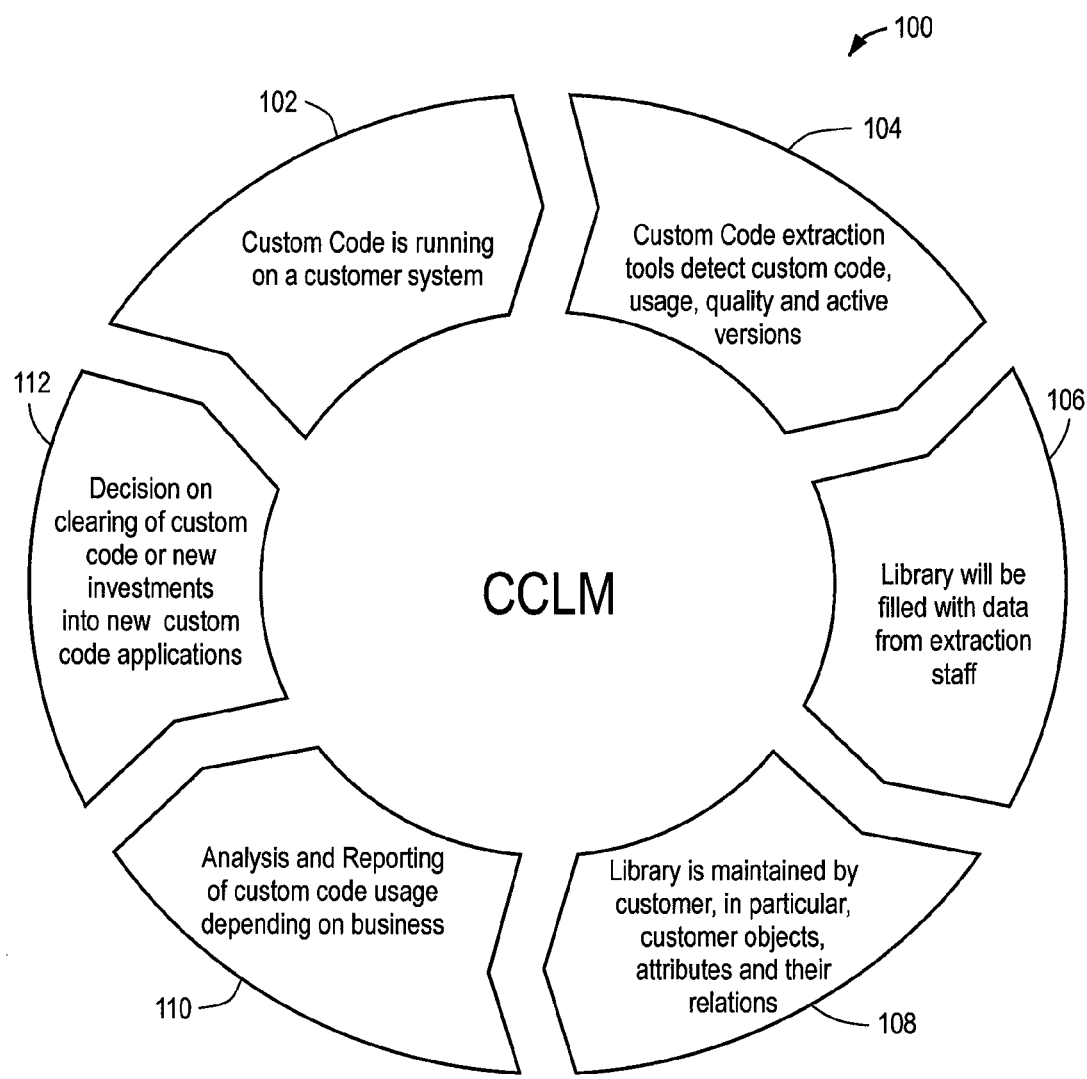
FIG. 1 is an illustrative drawing of a custom code lifecycle management process in accordance with some embodiments.

FIG. 1 is an illustrative drawing of a custom code lifecycle management process in accordance with some embodiments.

In stage 102 of the cycle, custom code runs on a computer system. In stage 104, custom code extraction tools detect the custom code that is running on the system, its usage, quality and active versions. In stage 106, data from the extraction is loaded into a library. In stage 108, an authorized user, e.g. a customer, may maintain the library. In particular, an authorized user may maintain custom objects, attributes and their relations. In stage 110, analysis and reporting of custom code usage may be provided. In stage 112, decisions can be made as to clearing or modifying custom code. It will be understood that the cycle is merely illustrative and the occurrence, ordering and details of events may vary.

System Architecture

Figure 2:
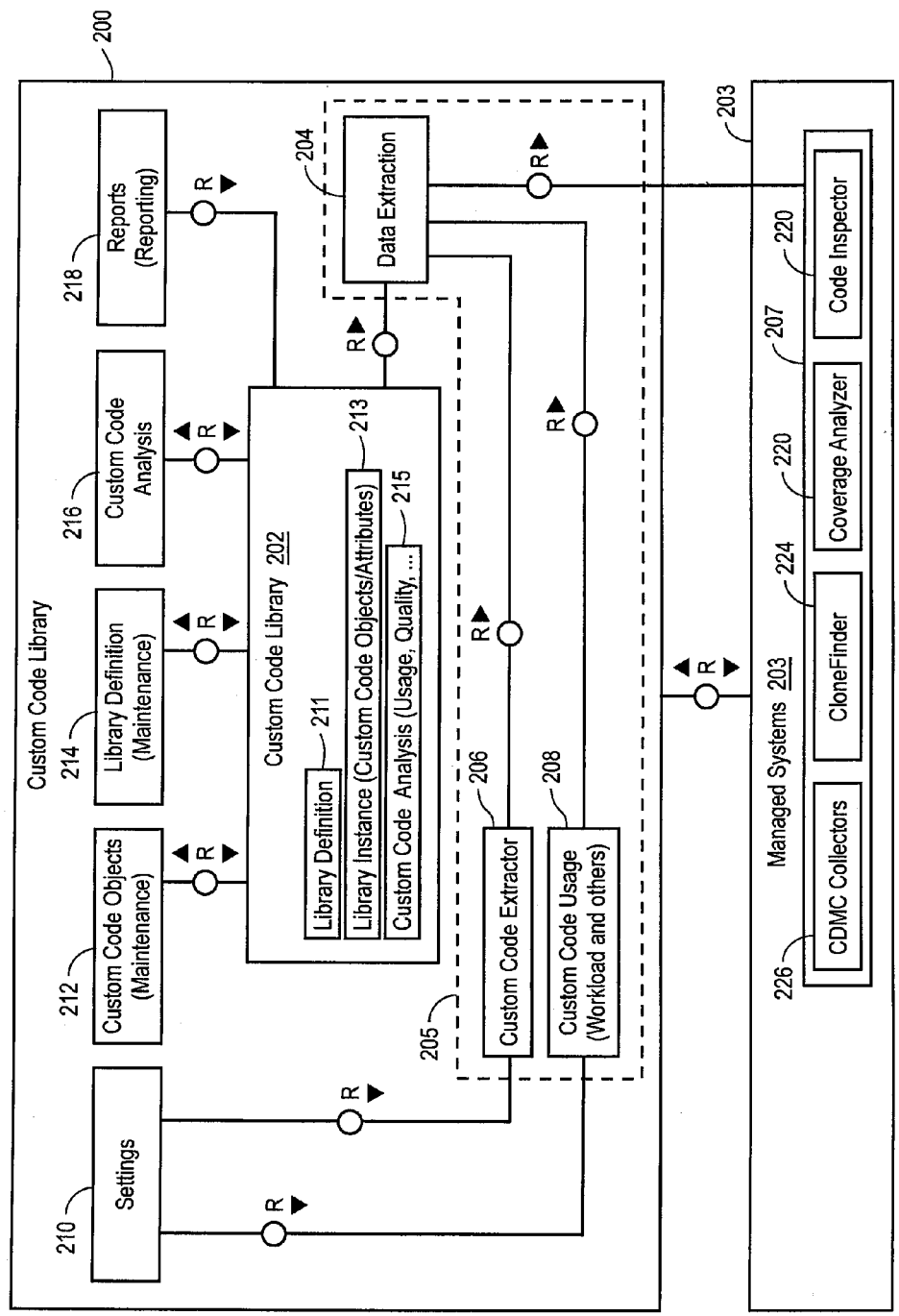
FIG. 2 is an illustrative drawing that shows an architecture level functional view of a system to manage custom computer program code and a managed system on which managed/custom code runs in accordance with some embodiments.

FIG. 2 is an illustrative drawing that shows an architecture level functional view of a system 200 to manage custom computer program code and a managed system 203 on which managed/custom code runs. The managing system 200 and the managed system 203 each comprise computer hardware configured using computer program code to implement the modules, information structures, objects, tables and functions described herein. The custom code management system includes a custom code library module 202, user interface control modules, 210, 212, 214, 216 and 218 and custom code extraction modules, shown within dashed lines 205. The managed system includes modules within block 207 that gather information about custom/managed code running on the managed system 203 that is reported to the custom code management system 200. As explained below, the managed system is the processing system that information is extracted from.

The custom code library module 202 is central to the system architecture 200. The library module 202 includes a management information structure 211 that corresponds to configuration of the managed system 202 and that is used to direct extraction of information about managed/custom code from the managed system 203. The library module 202 includes a master object data information structure 213 to create relations between objects that correspond to managed code running on the managed system 203 and attributes of the managed code. It will be appreciated that the managed code configures the managed system to perform various specific tangible acts. The library module 202 includes transaction instance structures 215 that are modeled after the master object information structure 213 and that are used to collect data about managed code that is running on the managed system 203. The user interface control modules 205 are directed to managing the library and to controlling input to and output from the library 202. The custom code extraction modules 207 are used to gather information concerning managed code from within the managed system 203 for input to the library 202. Details of the library module 202 will be described next before continuing with a description of the system architecture 200.

Data Structures

Figure 3:
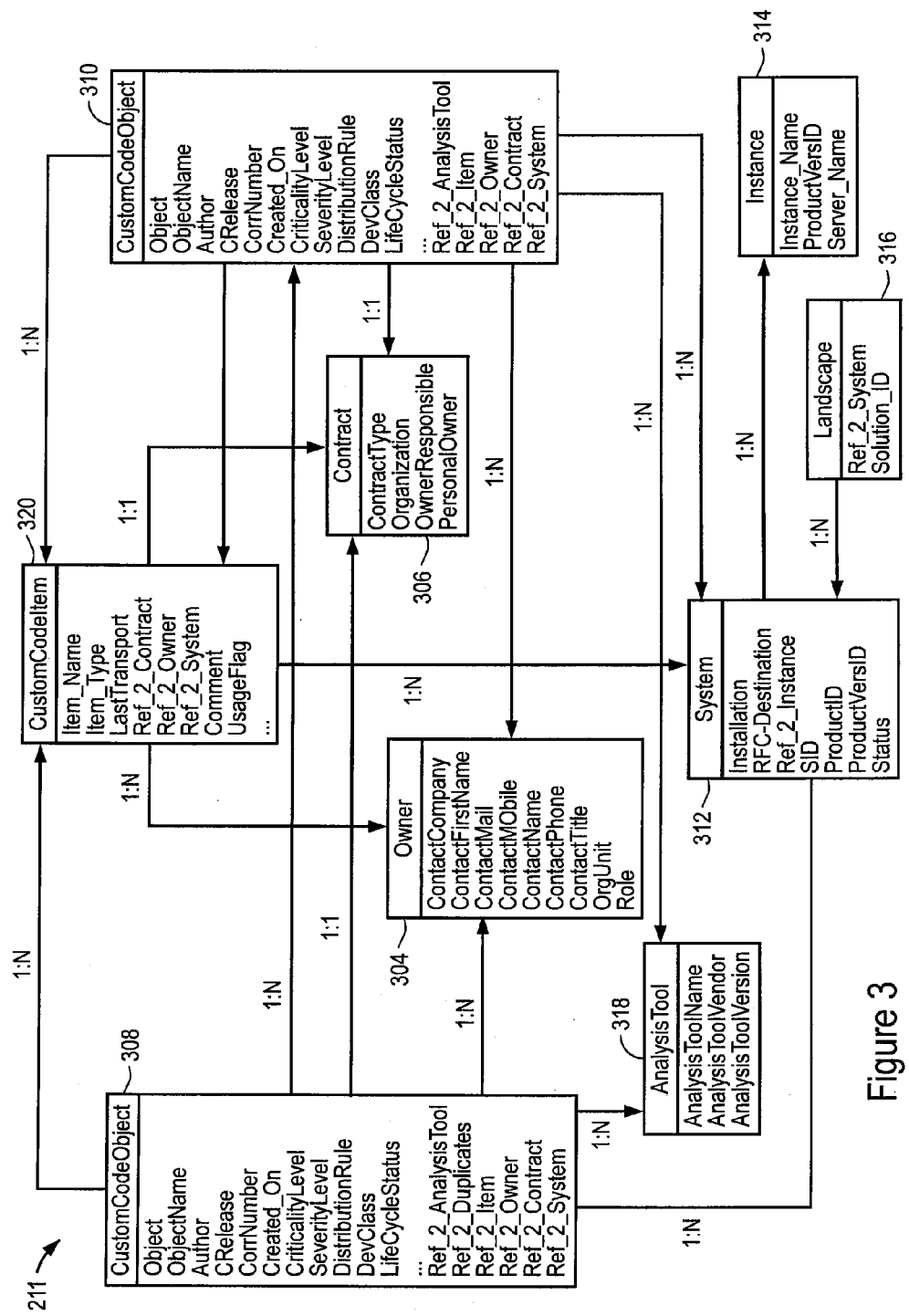
FIG. 3 is an illustrative drawing of a management information structure (objects and their attributes are illustrated) used to direct extraction of information about managed code from the managed system in accordance with some embodiments.

FIG. 3 is an illustrative drawing of a management information structure 211 used to direct extraction of information about managed code from the managed system 203 in accordance with some embodiments. In some embodiments, the management information structure 211 corresponds to configuration of the managed system 202. 'and that is used to direct extraction of information about managed/custom code from the managed system 203. The management information structure 211 constitutes also is referred to herein as a 'library instance'. The management information structure 211 comprises a set of objects, attributes and their relationships. It is of course possible to define other objects, attributes and relationships which constitute another instance. In some embodiments, the management information structure 211 is encoded in a computer readable storage device and includes object structures identified in the following Table 1. As explained in more detail below, the management information structure 211 comprises a template, i.e., collection and organization, of object structures used collectively, for example, to indicate authorization (e.g., contract and ownership), location or context (e.g., system, landscape, instance), analysis tool and duplicates. The collection and organization of objects within the management information structure 211 advantageously guide the automated extraction of information about managed/custom code from the managed system 203. In some embodiments, the object structures comprise tables. It will be appreciated that the objects shown as included in the management structure 211 are illustrative. Different objects may be used instead for different managed systems and to achieve different managed code management goals.

TABLE 1

| Object ID | Description | Maintainable |
| --- | --- | --- |
| Analysis Tool | Analysis tool | false |
| CustomCodeDuplicate | Duplicate of a custom code object | false |
| CustomCodeItem | Object item level (e.g. function module) | false |
| CustomCodeObject | Custom Code object | false |
| Instance | Instance | false |
| Landscape | Landscape information | false |
| Owner | Owner of Custom Code object or item | true |
| Contract | Contract for Custom Code object | true |
| System | System information | false |

The column 'Maintainable' indicates whether a prescribed user, e.g. a customer, can create or change a value associated with the object The management information structure 211 also includes attributes that are related to the objects. FIG. 4 is an illustrative drawing showing a representative portion of the management information structure 211 in XML format that provides relations between objects of the structure of FIG. 3 and attributes associated with the objects. It will be appreciated that an object also may be an attribute of another object.

Referring now to FIG. 3, the management information structure 211 includes a first CustomCodeObject object 308 that corresponds to and identifies managed/custom code that runs on the managed system 203. The managed/custom code is referred to as 'managed' code since it is the code about which information is extracted from the managed system 203. The managed/custom code also is referred to as 'custom' because it may be code that is created for some special purpose (e.g. standard software do not fulfill the requirements) by an owner of the code who now wants to monitor its use so as to better manage the code throughout its lifecycle in the managed system 203. The managed/custom code may be object oriented code that has attributes. The extracted information pertains to attributes of the managed code. Accordingly, the first object 308 possesses, i.e. has relationships, with attributes of the custom code to which it corresponds.

The first CustomCodeObject 308 has a second Custom Code Duplicate object 310, which comprises a duplicate of the first object 308. The presence of the duplicate second object 308 allows for extraction of information about corresponding managed code for but for a different landscape, for example. Duplicate information also can be important, for example, if a customer wants to merge development systems. (Generally, development systems are independent.) Note that at several different development landscapes each developer can create the same program or database table or structure. If these objects are deployed in a productive system, only one object can win, because each object is identified by special attributes like name, type and so on and that is then a potential problem and must be identified. Providing a duplicate object 310 addresses this kind of an issue, for example.

The first CustomCodeObject object 308 and second Custom Code Duplicate object 310 both own third CustomCodeItem object 320. The third object 320 may act as a sub-object that includes methods of a class, for example.

The first CustomCodeObject object 308 and second Custom Code Duplicate object 310 both own fourth Owner object 304. The fourth object 304 may be used to identify what individual representatives of an organization are the owner or person responsible for 308 and 310.

The first CustomCodeObject object 308 and second Custom Code Duplicate object 310 both own fifth Contract object 306. The fifth object 306 may correspond to and identify an organization such as a company that has contracted to the development of custom code objects (In an IT organization some application managers develop with their teams programs and other related staff and that is reported on contracts). In some embodiments the fourth Owner object 304 and the fifth Contract object 306 are created manually in order to maintain important information about responsibles and contract information for 308 or 310. (Example: A company develop software for another company and there must be a contract and responsible for each developed object, a contract can be also a maintenance contract and so on)

The first CustomCodeObject object 308 and second Custom Code Duplicate object 310 both own sixth AnalysisTool object 318 that identifies an analysis tool used to extract information from the managed system 200. The sixth AnalysisTool object 318 contains the name of the extractor and the Software Vendor as well as the version. This information can be used for technical assistance purposes, for example.

The first CustomCodeObject object 308 and second Custom Code Duplicate object 310 both own seventh System object 312. In some embodiments, a SAP Netweaver system, produced by SAP, Inc. having a place of business in Palo Alto, Calif. is identified by System ID and installation number, but alternatively, it can be a computer where a developer develops a program. The software which is running on such a system can be different and therefore it is important to have references between objects 308, 310 and 312. The seventh object 312 indicates the system where instances of the managed code run and where the extraction tool should look to find the managed code instance to extract information about it.

The seventh System object 312 owns an eighth Instance object 314 that identifies an instance of the System from which an extraction tool is to extract information. The System object 312 owns the Instance object 314 map to a particular processing system, i.e. to a managed system. In some embodiments, an Instance is a SAP Netweaver instance in that special case, but generally it can be also any application server. There can be more than one kind of application server in a system. For example there may be a PC running Windows (Windows Instance) and Linux (Linux Instance). It is clear that a special program is running on Windows, but not under Linux, but some programs can run under both operating systems.

A ninth Landscape object 316 owns the seventh System object 312. A landscape is a set of systems with a development system, one or more test systems and productive systems, all these systems are organizes/maintained in a solution) The ninth Landscape object 316 identifies all systems which are assigned to a landscape. For example all systems for America assigned to Solution 'America'; all systems with users in Europe are part of Solution 'Europa'; and so on.

Figure 7:
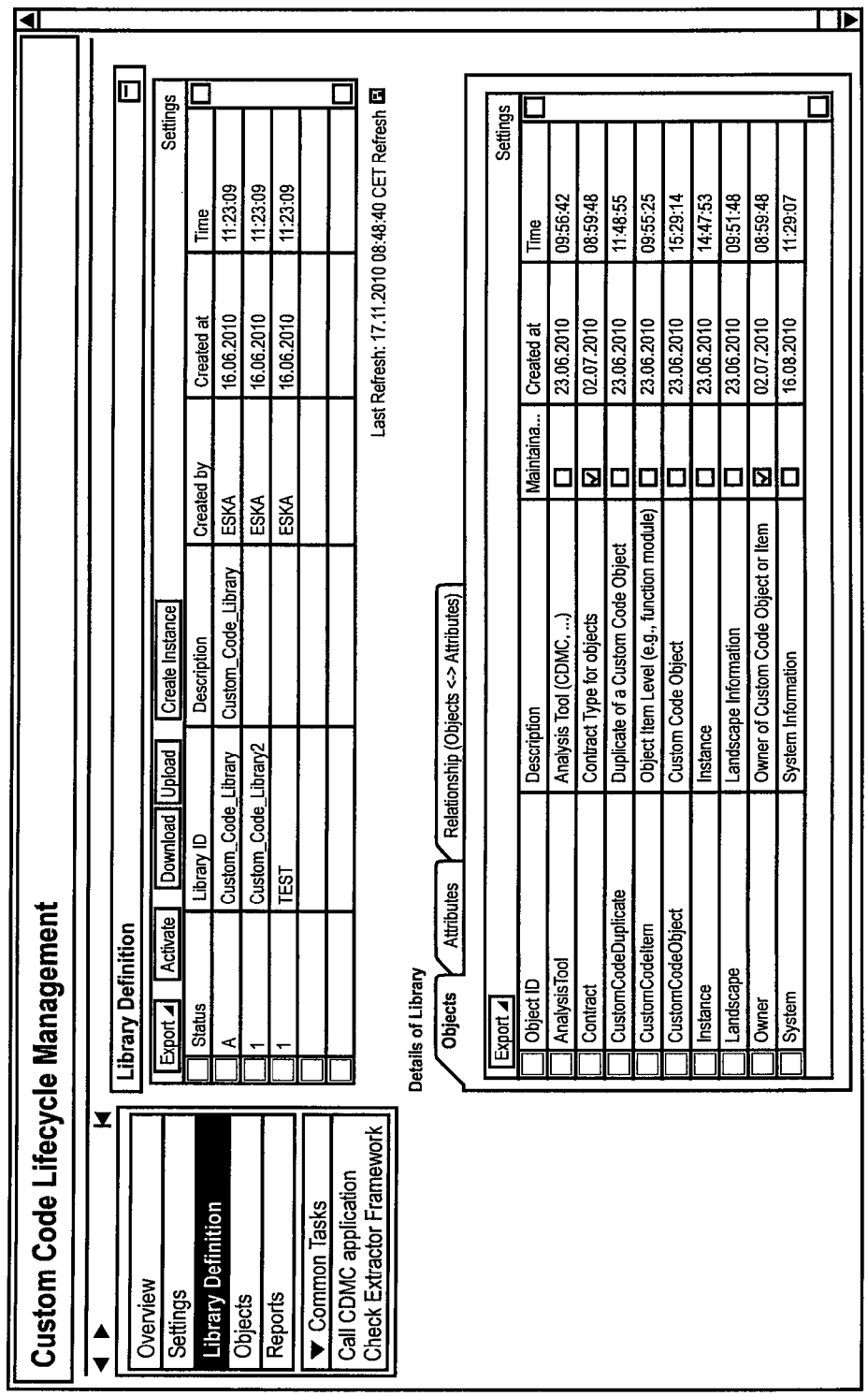
FIG. 7 is an illustrative drawing of an example user interface display screen in which a user can modify the management structure of FIG. 3 in accordance with some embodiments.

The detailed text shown within objects in FIG. 3 indicates the attributes assigned to the object. Furthermore the template library structure 211 can be changed. FIG. 7, discussed below, shows an illustrative user interface for upload and download of the library instance identified by the library ID. There can be only one active library instance managing custom code.

Figure 5:
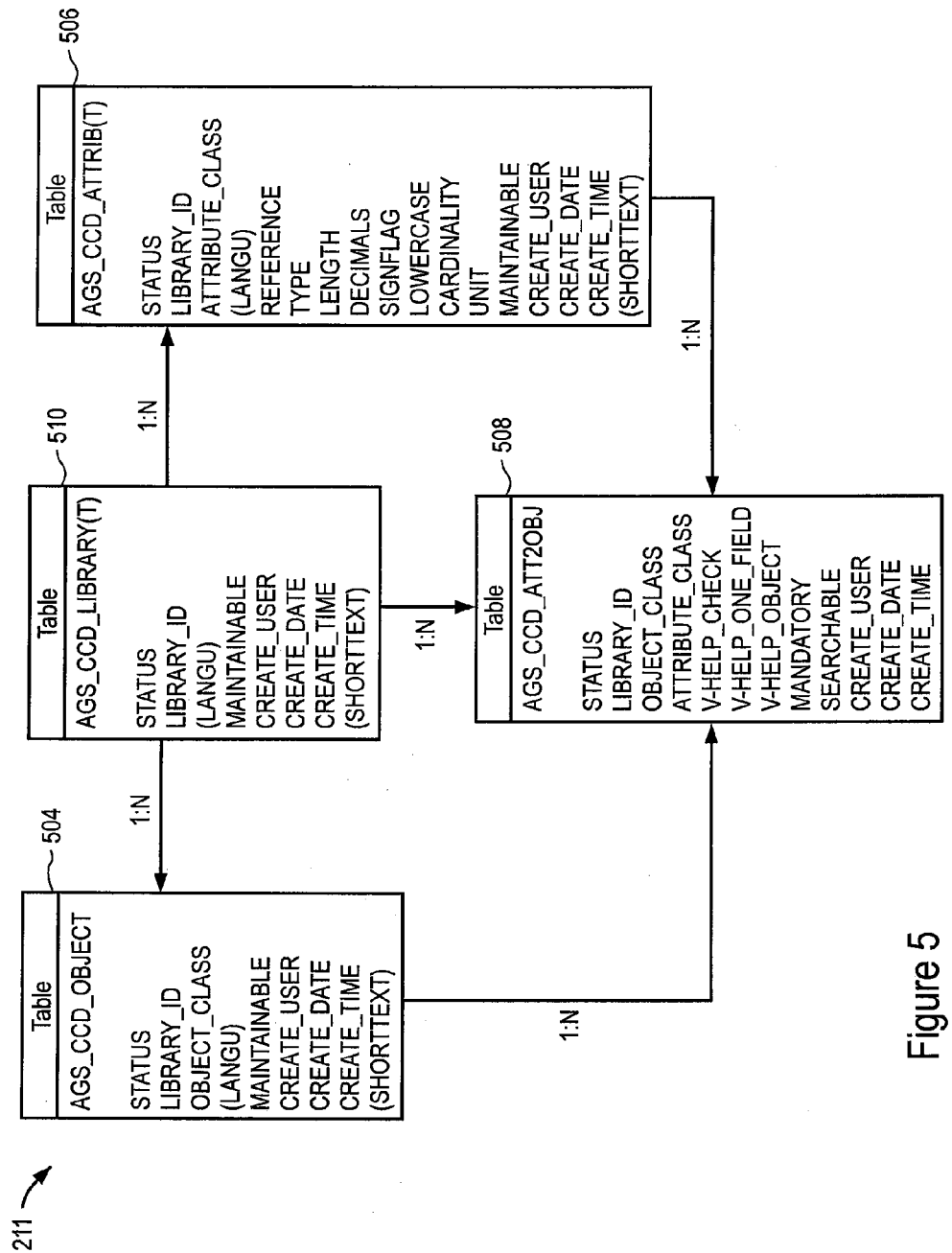
FIG. 5 is an illustrative drawing of a master object definition information structure to create objects, attributes and relations between objects and attributes that correspond to managed code that runs on the managed system and in which the information of the structure of FIG. 3 are saved.

FIG. 5 is an illustrative drawing of a master object definition structure information structure provides a master table structure where management information structure 211 is stored. The information in Table 1 is stored in object 504.

The management information structure 211 (also referred to as a 'library template') is stored with a master library object CCD_LIBRARY 510, and all nine described objects (304, 306, 308, . . . 320) of the master information structure 211 are stored as master objects in CCD_OBJECTS 504; all master attributes are stored in CCD_ATTRIB 506; and the relations or mappings between objects and attributes (FIG. 4) are stored in CCD_ATT2OBJ 508.

The master library object 510 can have instances of the master object 504 and master attributes 506 as well as the relationship (mapping) table 508.

Each of the master library object 510, the master object 504, master attribute object 506 and master relations object 508 includes Status and Library_ID. The Status has only two values (Active or Inactive) If an object or attribute has status 'Inactive' it is ignored. The Library_ID identifies a library definition or strictly speaking, a library definition instance. The library ID is later important for the information structure illustrated in FIG. 6 where master data information 213 and transaction data information 215 are stored. The Library Identifier acts as a master key for the other tables (504, 506, 508) and acts as the identifier of the Library (e.g., Library Name) of 202 of FIG. 2. The information structure of FIG. 5 contains the table design where the library definition 211 is saved. The OBJECT_CLASS in 504 is the identifier for the nine objects (CustomCodeObject, CustomCodeItem, . . . ) and the attribute class is the identifier of attributes like Object, Object Name, Author, CRelease, . . . as illustrated in FIG. 3. Each of the master object 504, master attribute object 506 and master relations object 508 identifies the objects of the information structure 211 shown in FIG. 3 that are saved in database tables.

Figure 6:
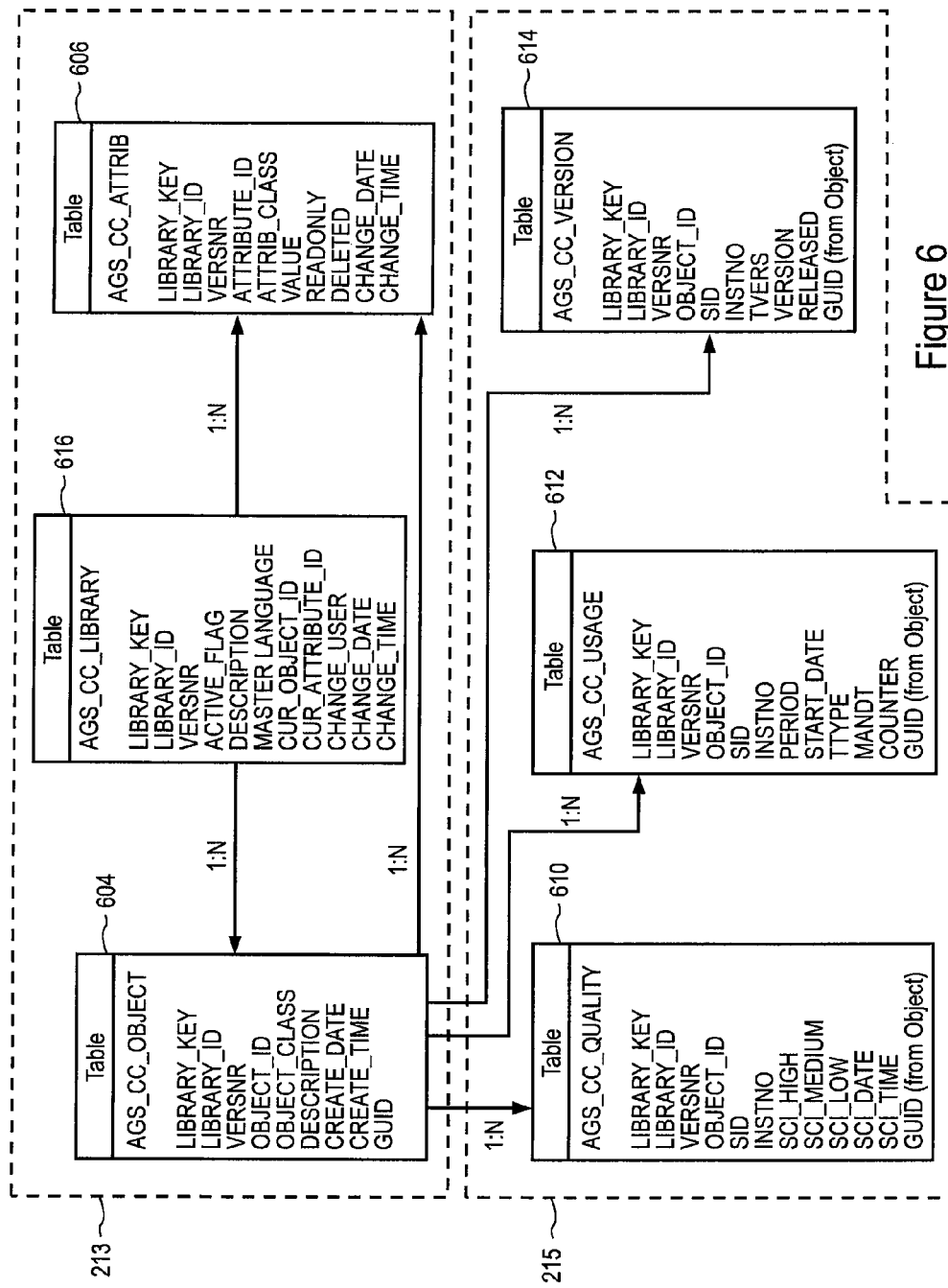
FIG. 6 is an illustrative drawing of a transaction information structure used to fill transaction instance information that is modeled after the master data information structure of FIG. 5 and that is used to collect data about managed code that is running on the managed system of FIG. 2 in accordance with some embodiments.

FIG. 6 is an illustrative drawing of an example transaction instance information structure that includes a master data information structure component 213 and a transaction data information structure component 215 and that is modeled with the master data information structure 211 of FIG. 3 and that is used to collect data about managed code that is running on the managed system 203 of FIG. 2. The transaction instance information structure 213/215 is stored in a computer readable storage device. Objects within the structure 213/215 are implemented as tables (FIG. 6) in some embodiments.

In this description, CCD (Custom Code Definition) objects in FIG. 5 contain the definitions, and CC (Custom Code) objects in FIG. 6 contain the values, the content which is collected by the extractors.

In the illustrative transaction instance information structures 213 and 215 a transaction library CC_Library object 616 owns a transaction data object CC_Object 604 and transaction data attribute CC_ATTRIB 606. FIG. 6 shows the relationships between the database tables for one entry. One instance which is identified by library key, library ID and version has many objects (CustomCode Objects)—therefore 1:N relationship, and each CustomCodeObject has many attributes—therefore 1:N relationship) The transaction data object 604 owns the transaction data attributes of objects 606 and owns the transaction data quality CC_Quality table 610, a transaction data usage CC_Usage table 612 and a transaction data version CC_Version table 614. The relationship here is that one CustomCodeObject (e.g. a program named 'ZORDER') can have many attributes and the quality can be different in several systems (CC_QUALITY) and that program can have several usages in different systems CC_USAGE and different versions in these systems. The tables identified as, Quality 610, Usage 612 and Version 614, are database tables where information for transaction data object 604 are stored for analysis and reporting purposes.

Thus, it will be appreciated that FIG. 6 illustrates the design for master transaction data of a Custom Code object 308 and transaction data of a Custom Code object 308. The overall structure 213/215 of FIG. 6 includes a transformation of the Custom Code object 308 in which a portion 213 that includes tables 616, 604, 606, shown within dashed lines, and includes portion 215 that includes tables 610,612,614, shown within dashed lines.

Each of the objects in the transaction instance information structure 213 and 215 contains Library_Key information, Library_ID information and Versnr information. A unique key is necessary to identify objects and their relations on database level. The library object 510 of FIG. 5 contains the value (identifier) for the Library ID, this Library ID together with Library Key and version (Versnr) define a Library instance for transaction data. Therefore 213 and 215 are called transaction instance information structures.

Each of the transaction data object 604, the transaction data attributes objects 606, the quality object 610, the transaction data usage object 612 and the transaction data version object 614 includes an Object_ID. The Object ID (object identifier) is unique and is used to store all information related to a certain object on database within a computer readable storage device.

Each of the transaction data quality table 610, the transaction data usage table 612 and the transaction data version table 614 includes SID and INSTNO which identify a system. The SID and INSTNO are unique identifiers to store all relevant information related to an Object ID on database for reporting purposes. Note that the attributes are independent from the quality of objects 610, the usage of objects 612 and the version of objects 614. There is no Attribute_ID in these tables. Attributes with an Attribute_ID are assigned to an Object 606 having an Object ID in order to determine the object in a detailed manner.

The transaction data attributes 606 includes an Attribute_ID. The Attribute ID is unique and is used to store all information related to that attribute. A transaction data object 604 can have many attributes (see definition in FIG. 3), and each attribute has a unique attribute identifier (Attribute_ID).

The transaction data of objects 604 identify the objects of the special OBJECT_CLASS of FIG. 3 that contains instances of the objects 304-320 (e.g. CustomCodeObject, Owner, Contract, . . . ). FIG. 3 contains the definition of a custom code library with nine objects and all this information is saved with respect to the table design of FIG. 5. The instance contains the extracted and collected data from managed systems 203. In some embodiments, there are 5812 CustomCodeObjects, 212 CustomCodeItems, 15 Custom- CodeDuplicates, 2 Landscapes, 11 Systems, 45 Owners and 8 Contracts, for example. Each object of a library instance is uniquely identified by an OBJECT_ID, and an additional GUID is created. Thus, the object data 604 and attribute data 606 contain the information defined by the template library information structure 211 of FIG. 3 that is required for the management of custom code that corresponds to a Custom-CodeObject 308 identified by an OBJECT_ID, and an additional GUID.

Operation of System Architecture

Returning to FIG. 2, operation of the managing system 200 and of the managed system 203 are explained in further detail. It will be appreciated that system and associated method and information structures of some embodiments makes it easier for a user to keep track of and to evaluate quality and usage and versions of managed objects. A library definition module 214 provides user access to update the management information structure 211. FIG. 7 is an illustrative drawing of an example user interface display screen in which a user can modify a management structure 211 in accordance with some embodiments. In the example screen display a management information structure 211 identified with the Library ID 'Custom_Code_Library' has been selected, and the nine objects comprising objects 308-320 described with reference to FIG. 3 are listed under an Objects tab. An Attributes tab and a Relationships tab may be selected to view attributes and object/attribute relationships which is also illustrated in FIG. 3 (e.g. attributes for Object 'Contract' are 'ContractType', 'Organization', 'OwnerResponsible' and 'PersonalOwner'.

A custom code object maintenance module 212 provides user access to collected objects that correspond to managed/custom code. FIG. 8 is an illustrative drawing of an example user interface display screen in which a user has selected a CustomCodeObject having an Object Name ZGG_01. Listed in a lower portion of the display screen under the 'Maintainable Attributes' tab are three maintainable attributes of the selected object (two attributes CriticalityLevel and SeverityLevel are shown in FIG. 3). A user may choose to 'Create', 'Change' or 'Delete' any of these attributes, for example depending on authorization to do that and the definition 506 (maintainable). Only maintainable attributes can be created, changed or deleted.

Figure 9:
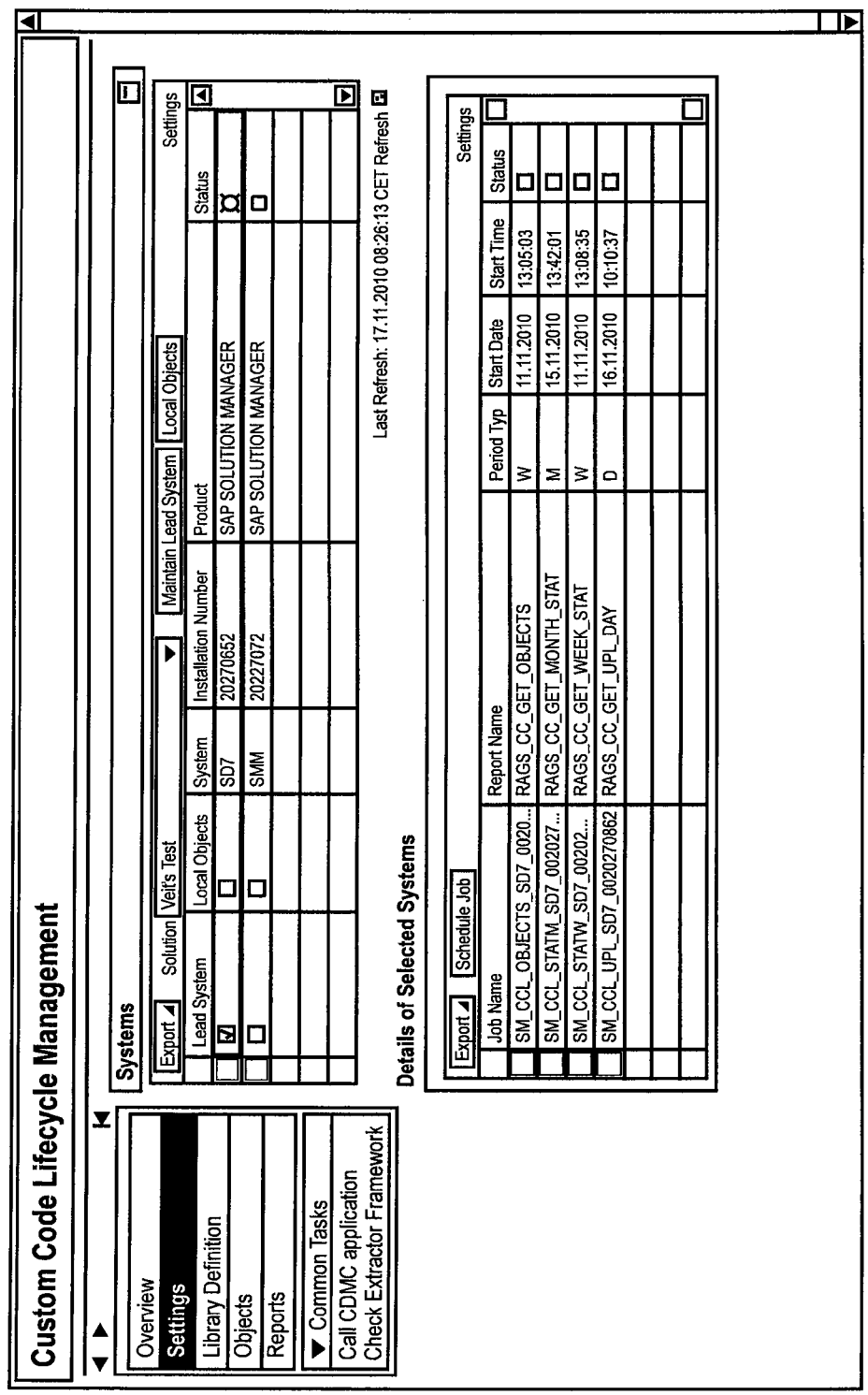
FIG. 9 is an illustrative drawing of an example user interface display screen to control the custom code extractor module in accordance with some embodiments.

A settings module 210 provides a user interface for use in instructing the custom code extractor module 206 and the custom code usage module 208. FIG. 9 is an illustrative drawing of an example user interface display screen to control the custom code extractor module 206. In the example screen display a System object identified by System and Installation Number. The details for the selected System Object display the AnalysisTool Object as 'SM_CCL: OBJECTS_<SID>_<Installation Number>' has been selected together with a report/program name 'RAGS_CC_GET_OBJECTS'. Other rows in the display of 'Details of Selected System' in FIG. 9 specify usage, quality and version data. Custom code extractor module 206 notifies data extractor module 204, which calls a program and that calls a function module corresponding to defined collector with the name SM_CCL: OBJECTS_<SID>_<Installation Number> via RFC destination in the managed system 203 and extracts a list of custom code objects 604 and related attributes 606 identified in FIG. 6. Custom code objects 604 and their attributes 606 act as master data. The custom code usage module 208 notifies the data extractor module 204 of information to be retrieved for corresponding transaction data quality 610, corresponding transaction data usage 612 and corresponding transaction data version 614. Information extracted by 204 for a en given extracted object is delivered to the library module 202 of the managing system 203 within transaction instance information structure like that of FIG. 6.

Data extractor 204 (small framework for data collection) calls an extractor (i.e. an AnalysisTool) that runs on the managed system 203 to extract information about managed objects that also run on the managed system 203. In some embodiments, the managed system 203 includes modules that gather information about code running on the system 203. A code inspector module 220 monitors code for errors. For example, it keeps track of 'errors' and 'warnings' issued in connection with code (i.e. objects). A coverage analyzer 222 collects information concerning workload data for code. A clone finder module 224 may gather information about copies of an object that run on the system 203. A custom development manager module 226 collects a list of managed objects running on system 203. It will be appreciated, however, that alternatively, system 203 can be of course also a productive system and there was no code developed, but the code was developed in another system. One or more extractor tools launched at the direction of the data extractor 204 and trigger the modules 220-226 that run on the managed system 203. Information extracted for given managed objects are delivered to the library module 202 of the managing system 203 within transaction instance information structure like that of FIG. 6.

Figure 10:
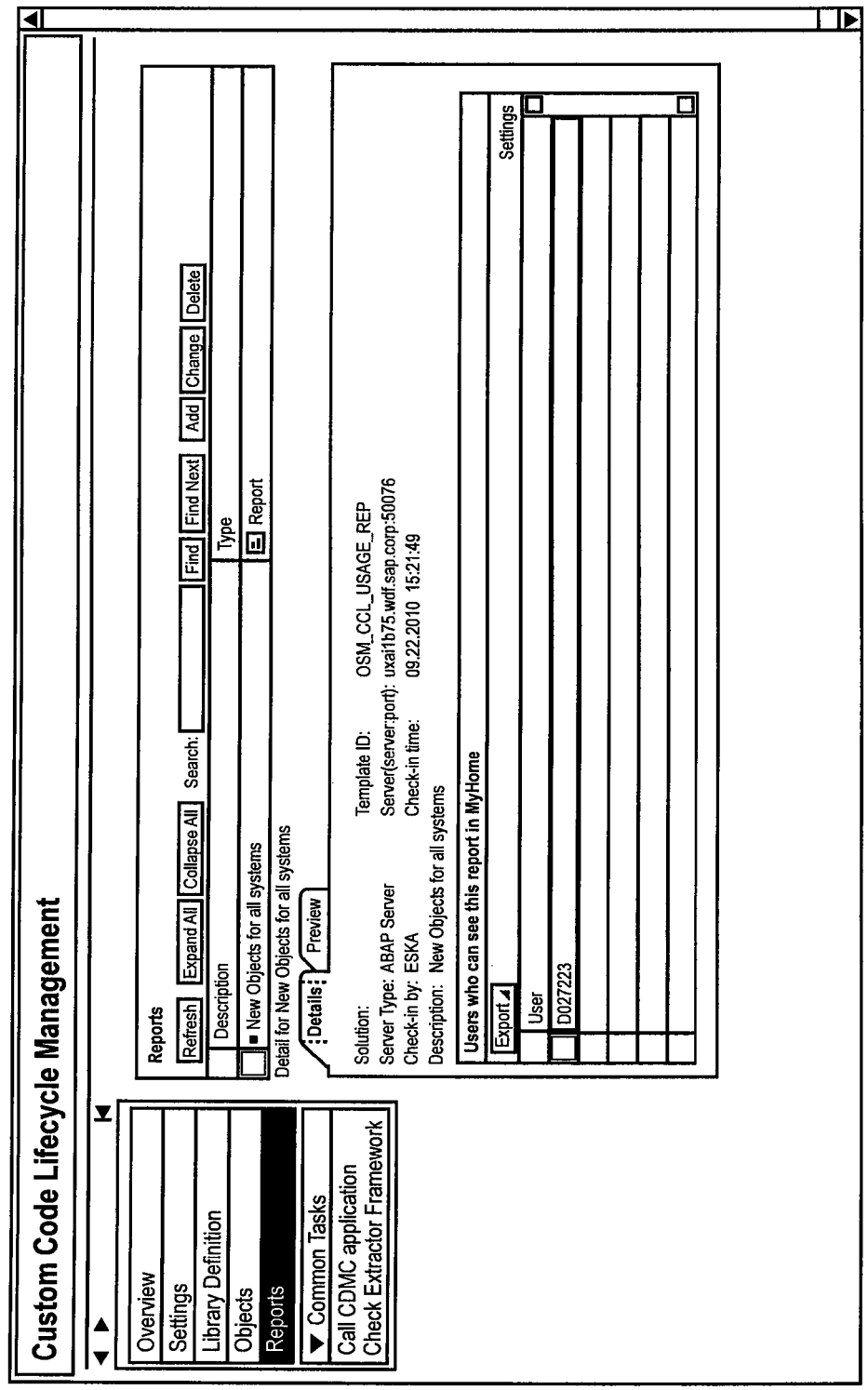
FIG. 10 is an illustrative display screen to produce reports of transaction instance information structure extracted in response in accordance with some embodiments.

Custom code analysis module 216 is used in the analysis of contents of transaction instance information structure 215 like that of FIG. 6 that contains information about managed code extracted by the data extraction module 204. FIG. 10 is an illustrative display screen to check in reports of transaction instance information structures 213 and 215 extracted in response the data extraction module 204.

Architecture System Processing Using the Data Structures

Figure 11:
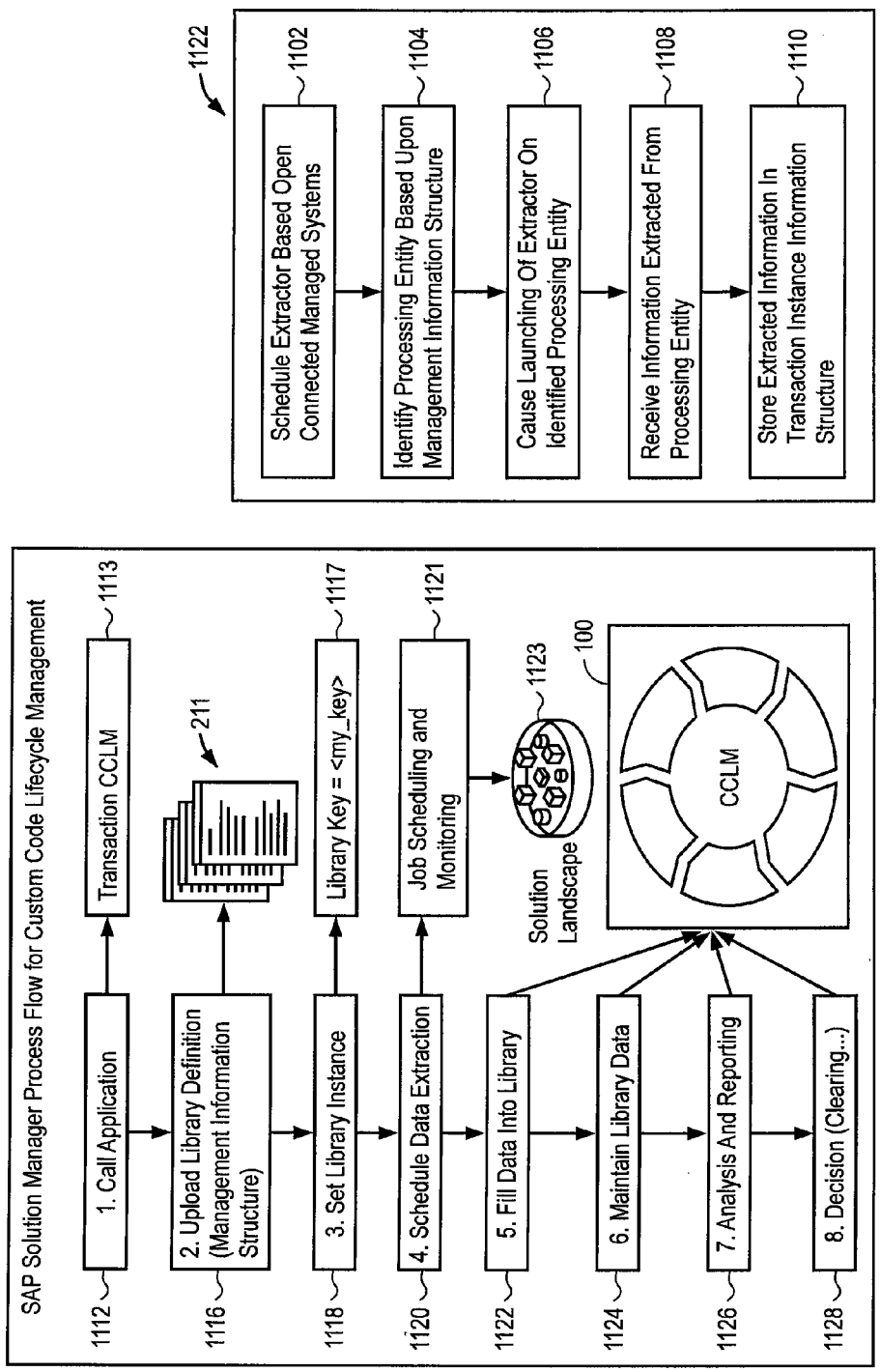
FIG. 11A is an illustrative flow diagram of an overall process in accordance with some embodiments.
FIG. 11B is an illustrative flow diagram representing details of the process of FIG. 11A involving filling data into master object definition and transaction information structures in accordance with some embodiments.

FIG. 11A is an illustrative flow diagram of an overall process in accordance with some embodiments. Block 1112 represents the act of calling transaction program code to start a Custom Code Lifecycle Management (CCLM) program represented by block 1113. A user may periodically call the transaction program 1113 to set code extraction requirements or modify the library structure as explained with reference to FIGS. 7-10, for example. Block 1116 represents the act of uploading an XML library definition file illustrated in FIG. 4. Structure and content of the file, in some embodiments, is represented by the management information structure 211 of FIG. 3. The upload of the library definition file is achieved by actuation of the "Upload" button in the UI screen of FIG. 7. Block 1118 represents the act of creating a library instance having a library key 1117. The key is important for master data information structures 213 and transaction data information structure 215. Creation of a library instance having a key 1117 is achieved by actuation of the "Create Instance" button in the UI screen of FIG. 7. Block 1120 represents the act of scheduling data extraction, which a user may accomplish though interactions with the UI screen of FIG. 9. For example, a user may create a structure to indicate times job scheduling and monitoring to be applied to a landscape 1123 designated in the management information structure 211. Block 1122 represents the act of filling data into the library structure of FIGS. 213, 215, which is explained in more detail in FIG. 11B.

Operation of the illustrative custom code lifecycle management process 100 of FIG. 1 occurs through acts represented by blocks 1122-1128. The act represented by block 1122 begins with filling extracted data to the master information structure 213 and transaction information structure 215 of FIG. 6. The act of block 1122 may occur periodically depending upon job scheduling and monitoring of block 1121. Block 1124 represents the act whereby customers can maintain Custom Code Objects via the UI of FIG. 8. Block 1124 represents a manual user initiated act whereby customers can check reports via the UI of FIG. 8. Block 1126 represents a manual user initiated act whereby a user can check reports via the UI of FIG. 10. Block 1128 represents user activity in which a user can decide to delete custom code in order to replace by standard functionality, if for example the extracted custom code running on managed systems is not used or is redundant in that it has the same functionality as standard functions which are supported by a vendor who produces standard software. No UI screen because this activity involves reporting to the user staff, for example.

FIG. 11B is an illustrative flow diagram representing details of the act of block 1122 involving filling data into the master and transaction information structures of 213, 215, in accordance with some embodiments. More particularly FIG. 11B is an illustrative flow diagram of a process performed by the managing system of FIG. 2 that uses the information structures of FIGS. 3-6 to control the extraction of information about managed code from the managed system of FIG. 2. At a time designated by an authorized user through the interface display of FIG. 9 to the settings module 210, for example, the managing system 200 readies for extraction of information.

In block 1102, the data extraction module 204 accesses the custom code extractor 206 and the custom code usage extractor 208 to determine what kind of data (management information structure 211) can be extracted.

In block 1104, the data extraction module 204 accesses the management information structure 211 of FIG. 3. Based upon the CustomCodeObject 308, System object 312, Instance object 314 and Landscape object 314 it identifies a processing entity, e.g. the managed system 203, where the managed/custom code runs and where the mentioned entities can be extracted.

In block 1106, the data extraction module 204 causes a launching or running of the identified extraction tool within the identified processing entity to extract from managed/custom code identified by the master data structure 213 the information to be input to or associated with tables of the transaction structure 215.

In block 1108, the data extraction module 204 receives information extracted from the identified processing entity. In block 1110, the extracted information is stored in the library module 202 within custom code object 604, the custom code attributes 606 with the library instance 616 of the master data structure 213, the quality object 610, the transaction data usage object 612 and the transaction data version object 614 of the transaction instance information structure 215. The extracted information can be accessed from these tables for customer maintenance, reporting and analysis, for example.

Hardware Embodiment

Figure 12:
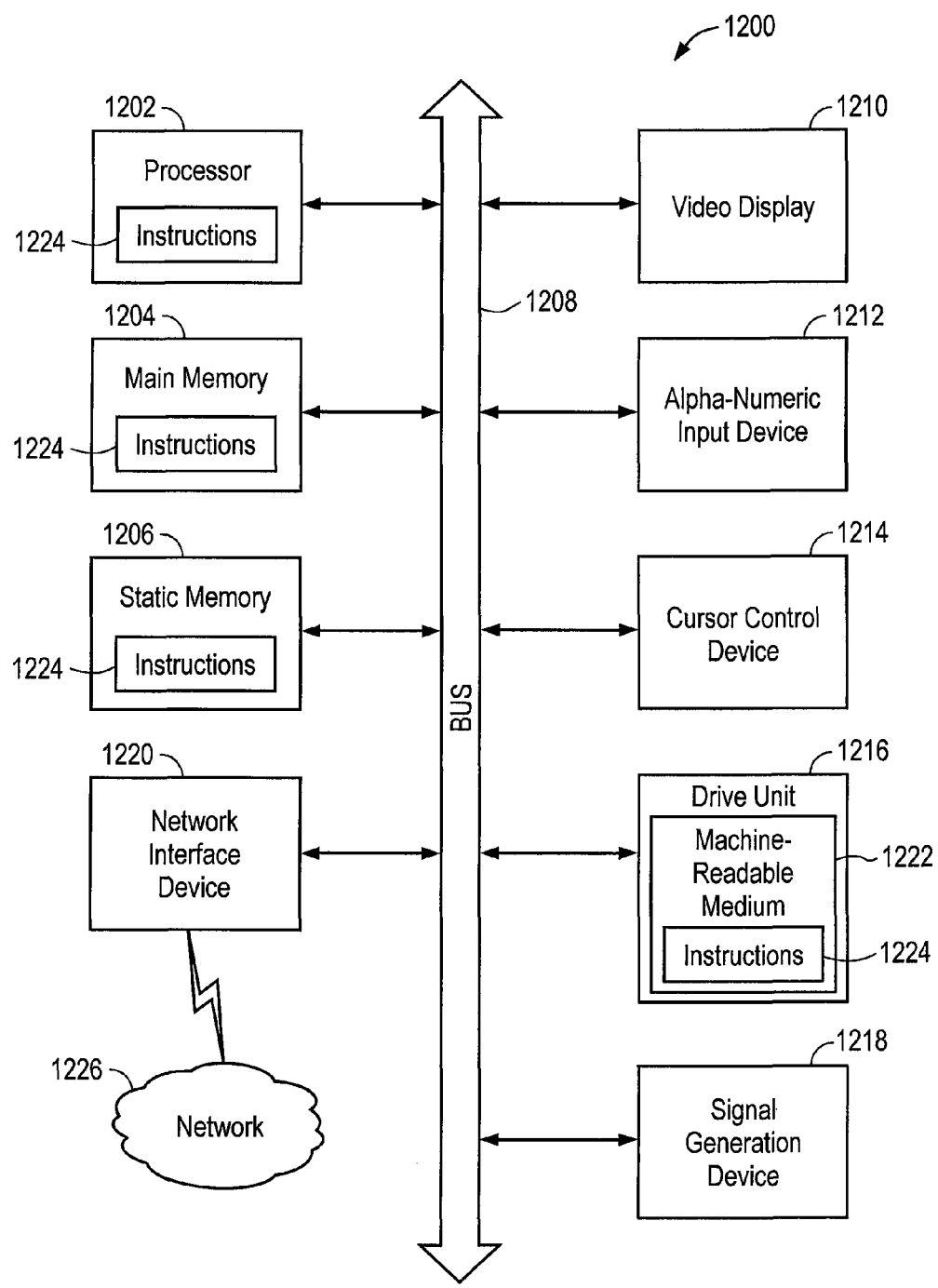
FIG. 12 is a block diagram of a computer processing system within which a set of instructions, for causing the computer to perform any one or more of the methodologies discussed herein, may be executed.

FIG. 12 is a block diagram of a computer processing system within which a set of instructions, for causing the computer to perform any one or more of the methodologies discussed herein, may be executed. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment. In a networked deployment, the computer may operate in the capacity of a server or a client computer in a server-client network environment, or as a peer computer in a peer-to-peer (or distributed) network environment.

Embodiments may also, for example, be deployed by Software-as-a-Service (SaaS), Application Service Provider (ASP), or utility computing providers, in addition to being sold or licensed via traditional channels. The computer may be a server computer, a personal computer (PC), a tablet PC, a set-top box (STB), a Personal Digital Assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 1200 includes processor 1222 (e.g., a central processing unit (CPU), a graphics processing unit (GPU) or both), main memory 1204 and static memory 1206, which communicate with each other via bus 1208. The processing system 1200 may further include video display unit 1220 (e.g., a plasma display, a liquid crystal display (LCD) or a cathode ray tube (CRT)). The processing system 1200 also includes alphanumeric input device 2122 (e.g., a keyboard), a user interface (UI) navigation device 1214 (e.g., a mouse, touch screen, or the like), a disk drive unit 1216, a signal generation device 1218 (e.g., a speaker), and a network interface device 1220.

The disk drive unit 1226 includes computer-readable medium 1222 on which is stored one or more sets of instructions and data structures (e.g., software 1224) embodying or utilized by any one or more of the methodologies or functions described herein. The software 1224 may also reside, completely or at least partially, within a computer readable storage device such as the main memory 1204 and/or within the processor 1222 during execution thereof by the processing system 1200, the main memory 1204 and the processor 1122 also constituting computer-readable, tangible media.

The software 1224 may further be transmitted or received over network 1226 via a network interface device 1220 utilizing any one of a number of well-known transfer protocols (e.g., HTTP).

While the computer-readable medium 1222 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "computer-readable medium" shall accordingly be taken to include, but not be limited to, solid-state memories, and optical and magnetic media.

While the invention(s) is (are) described with reference to various implementations and exploitations, it will be understood that these embodiments are illustrative and that the scope of the invention(s) is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

The invention claimed is:

1. A method to manage program code that runs in multiple computer systems comprising:
   producing in a managing system a master object definition information structure in a non-transitory computer readable storage device that includes a library identifier and that includes a management information structure that includes a custom code object that identifies and multiple respective custom code duplicate objects that each identify corresponding one or more managed code instances that run in one or more managed systems, wherein the custom code object owns a corresponding first object that indicates respective managed systems that run one or more instances of the identified corresponding managed code instances, and wherein the custom code object owns a corresponding second object that identifies one or more respective analysis tools to be used to extract transaction data for the respective one or more managed code instances from the indicated respective managed systems;
   producing in the managing system a transaction instance information structure that includes a library identifier and that includes a transaction data object that corresponds to the custom code object in the master object definition information structure, wherein the transaction data object owns one or more tables to store managed code transaction data from managed code instances running on managed systems;
   receiving information into a user interface in communication with the managing system to select a managed code instance identified by a corresponding custom code object within the master object definition information structure;
   extracting transaction data for a selected managed code instance from a respective managed system indicated by the corresponding first object within the master object definition information structure as running the selected managed code instance and using an analysis tool, identified by a corresponding second object within the master object definition information structure as an analysis tool to be used to extract transaction data for the selected managed code instance corresponding analysis tool, and storing the extracted transaction data in the one or more tables; and
   wherein receiving information into the user interface includes receiving a schedule for extraction of data relating to the selected managed code instance; and wherein extracting transaction data for the selected managed code instance from the respective managed system indicated by the corresponding first object within the master object definition information structure includes, extracting the information according to the schedule.

2. The method of claim 1 wherein the extracted transaction data includes managed code transaction data about managed code object quality.

3. The method of claim 1 wherein the extracted transaction data includes managed code transaction data about managed code object usage.

4. The method of claim 1 wherein the extracted transaction data includes managed code transaction data about managed code object version.

5. The method of claim 1 wherein the code object that indicates the system owns a code object that indicates a system instance to identify a managed system.

6. The method of claim 1 wherein the management information structure indicates restrictions on modifications to the management information structure.

7. The method of claim 1 wherein the management information structure includes a class structure of master objects identified within the master object definition information structure.

8. The method of claim 1 wherein the master object definition information structure defines relations between master objects and attributes that relate to corresponding managed code objects.

9. The method of claim 1,
   wherein the master object definition information structure defines relations between master objects and attribute objects that relate to corresponding managed code objects;
   wherein the management information structure includes a class structure of master objects identified within the master object definition information structure; and
   wherein master objects included within the management information structure include one or more attributes.

10. A computer system that includes:
   a managing computer system that includes a non-transitory computer readable storage device;
   a master object definition information structure in the non-transitory computer readable storage device that includes a library identifier and that includes a management information structure that includes a custom code object that identifies and multiple respective custom code duplicate objects that each identify corresponding one or more managed code instances that run in one or more managed systems, wherein the custom code object owns a corresponding first object that indicates respective managed systems that run one or more instances of the identified corresponding managed code instances, and wherein the custom code object owns a corresponding second object that identifies one or more respective analysis tools to be used to extract transaction data for the respective one or more managed code instances from the indicated respective managed systems; and
   a user interface in communication with the managing system configured to receive information to select a managed code instance identified by a corresponding custom code object within the master object definition information structure means for managing the management information structure;
   a transaction instance information structure in the non-transitory computer readable storage device that includes library identifier and that includes a transaction data object that corresponds to the custom code object in the master object definition information structure, wherein the transaction data object owns one or more tables to store managed code transaction data from managed code instances running on managed systems;

wherein the managing computer system is configured to request extraction of transaction data for a selected managed code instance from a respective managed system indicated by a corresponding first object within the master object definition information structure as running the selected managed code instance using an analysis tool, identified by a corresponding second object within the master object definition information structure as an analysis tool to be used to extract transaction data for the selected managed code instance, and to store the extracted transaction data in the one or more tables; and wherein the user interface is configured to receive information indicting a schedule for extraction of data relating to the selected managed code instance; and wherein the managing computer system is configured to request extraction according to the received schedule.

11. The method of claim 1, wherein the code object owns an object that identifies a party responsible for the code object.

12. The method of claim 1, wherein the code object owns an object that that identifies a party that contracted to develop the code object.

13. The method of claim 1, wherein the master object definition information structure includes:

a master library object that includes the management information structure, an attribute object and relationship mapping object that maps objects in the management information structure with attributes in the attribute object.

14. The method of claim 7, wherein the code object owns an object that includes methods of the class.

15. A method to manage program code that runs in multiple computer systems comprising:

producing in a managing system a master object definition information structure in a non-transitory computer readable storage device that includes a library identifier and that includes a management information structure that includes a custom code object that identifies corresponding one or more managed code instances that run in one or more managed systems, wherein the custom code object owns a corresponding first object that indicates respective managed systems that run one or more instances of the identified corresponding managed code instances;

producing in the managing system a transaction instance information structure that includes a library identifier and that includes a transaction data object that corresponds to the custom code object in the master object definition information structure, wherein the transaction data object owns one or more tables to store managed code transaction data from managed code instances running on managed systems;

receiving information into a user interface in communication with the managing system to select a managed code instance identified by a corresponding custom code object within the master object definition information structure;

extracting transaction data for a selected managed code instance from a respective managed system indicated by the corresponding first object within the master object definition information structure as running the selected managed code instance, and storing the extracted transaction data in the one or more tables; and wherein receiving information into the user interface includes receiving a schedule for extraction of data relating to the selected managed code instance; and wherein extracting transaction data for the selected managed code instance from the respective managed system indicated by the corresponding first object within the master object definition information structure includes, extracting the information according to the schedule.

16. A computer system that includes:

a managing computer system that includes a non-transitory computer readable storage device;

a master object definition information structure in the non-transitory computer readable storage device that includes a library identifier and that includes a management information structure that includes a custom code object that identifies corresponding one or more managed code instances that run in one or more managed systems, wherein the custom code object owns a corresponding first object that indicates respective managed systems that run one or more instances of the identified corresponding managed code instances; and user interface in communication with the managing system configured to receive information to select a managed code instance identified by a corresponding custom code object within the master object definition information structure; and a transaction instance information structure in the non-transitory computer readable storage device that includes library identifier and that includes a transaction data object that corresponds to the custom code object in the master object definition information structure, wherein the transaction data object owns one or more tables to store managed code transaction data from managed code instances running on managed systems;

wherein the managing computer system is configured to request extraction of transaction data for a selected managed code instance from a respective managed system indicated by a corresponding first object within the master object definition information structure as running the selected managed code instance, and to store the extracted transaction data in the one or more tables; and wherein the user interface is configured to receive information indicting a schedule for extraction of data relating to the selected managed code instance; and wherein the managing computer system is configured to request extraction according to the received schedule.

* * * * *